Nov. 1, 1927.

L. O. STEINKE 1,647,155

HEATING DEVICE

Filed April 13, 1927

INVENTOR
Leroy O. Steinke
BY
Carl H. Crawford
ATTORNEY

Patented Nov. 1, 1927.

1,647,155

UNITED STATES PATENT OFFICE.

LEROY O. STEINKE, OF SPOKANE, WASHINGTON.

HEATING DEVICE.

Application filed April 13, 1927. Serial No. 183,493.

This invention relates to an improved heating device which may be embodied either in a heating stove or which may form the interior portion of a hot air furnace.

It is one of the objects of this invention to spread the flame toward the outer radiating shell in such an effective manner as to obtain a very efficient radiation of heat therefrom.

It is a further object to retain the products of combustion closely adjacent the shell during the upward flow of the former for a portion of the height of the shell.

A feature of my invention consists in a spreader that is disposed over the grate and that is constructed of material of high heat conductivity so that while the heater is in operation, the spreader will glow to a state of incandescence thereby serving not only to destroy and burn up soot, but also serving to expand the products of combustion by superheating the same and not only increasing the efficiency of the heater but also accelerating the draft therefrom.

A further object is to provide an insulator of a very low degree of heat radiation and conductivity within the spreader with a view of preventing the heat from flowing inwardly away from the radiating shell and also serving to force the products of combustion to take a circuitous path in very effective relation to the incandescent walls of the spreader.

The invention has many other features and objects that will be more fully described in connection with the accompanying drawing and which will be more particularly pointed out in and by the appended claims.

In the drawing.

Like characters of reference designate similar parts throughout the different figures of the drawing.

Figure 1:
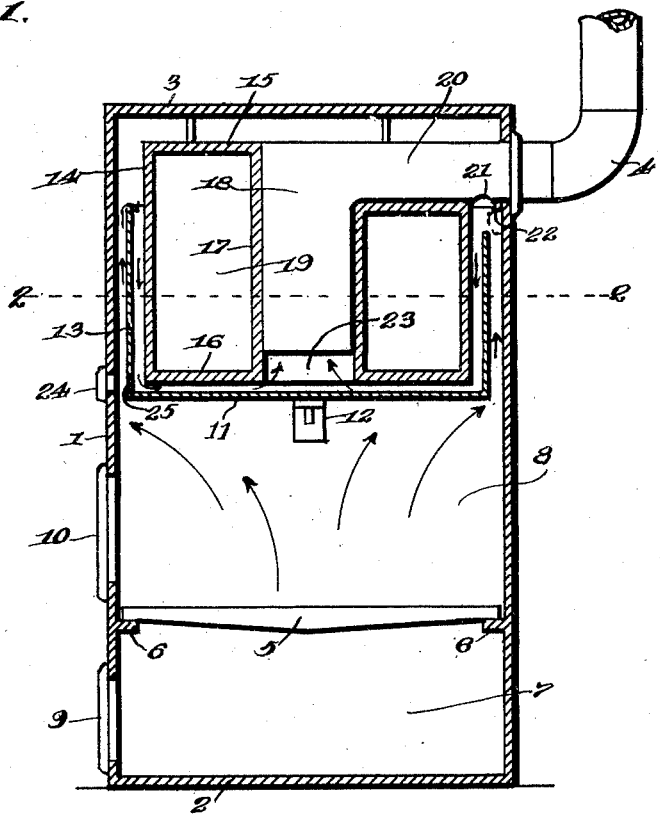
Fig. 1, is a vertical sectional view of one form of the device of my invention.
Figure 2:
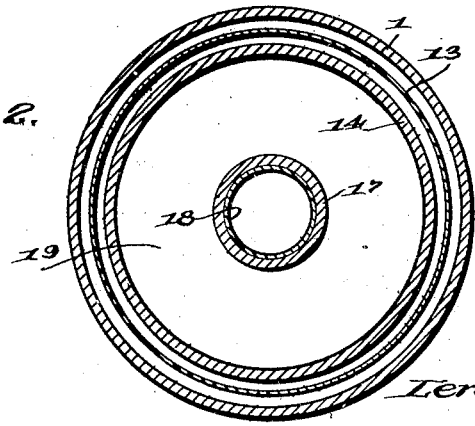
Fig. 2, is a sectional view on line 2—2 of Fig. 1.

As shown, the heating device includes an outer radiating shell 1, which may, in a heating stove, form the outside wall, and which may, in a hot air furnace, be a radiating wall inside the outer casing for heating the upwardly flowing air. The shell has a bottom wall 2, a top wall 3 and a flue 4, which latter is the usual stove pipe. Any form of grate 5, mounted as at 6, divides the shell into a lower ash pit 7 and an upper combustion chamber 8. Doors 9 and 10, for removal of the ashes and insertion of the fuel, respectively, may be of any desired form.

I will next refer to what more specifically constitutes my invention, in the combination set forth.

I have shown a flame spreader and soot burner which has a bottom wall 11, that may properly be termed a crown-sheet and against which the flames may play and be spread outwardly, and, in the present construction, radially outwardly toward the shell 1, so that the latter will more effectively radiate heat. Suitable supports, such as brackets 12, may serve to support said wall 11, at the proper elevation in the heating device. I preferably make this wall of a very thin material, or in any event, of a material of high heat conductivity, so that when the heating device is in service, the wall 11 will be heated to a state of incandescence. In the form shown, I have embodied the spreader in the form of a cup with an annular wall 13 that is also of a thin material or one of high heat conductivity. The diameter of wall 13 is such that it is disposed very closely to the inside of shell 1 so as to retain the upwardly flowing products of combustion in close relation thereto. By making the spreader of a material of high heat conductivity, the heat from wall 11 will be transmitted to wall 13 and maintain the latter as nearly as possible at as high a temperature as wall 11.

As a further means of preventing heat from remaining in the interior of the heater, I provide what I will term an insulator, the same being shown in the form of an annular drum having an outside wall 14, top and bottom walls 15 and 16, respectively, and an inner and preferably central wall 17. The latter wall forms a bore through the drum through which an extension 18 of the stove pipe projects. The interior of the drum, as indicated at 19, is dead air space, which forms an efficient insulator against heat absorption beyond a limited extent. It will be noted that the extension 18 is considerably enlarged in diameter with respect to the diameter of pipe 4, the importance of which will later appear. A connection of normal diameter, as indicated at 20, unites flue 4, with extension 18. A closure 21, hinged at 22, and suitably operated from the exterior of the device, may, when open, permit direct flow of the products of combustion to the flue 4, and when closed, forces the products of combustion to take a circuitous path which will presently be described.

I will next describe the operation of my improved heating device.

In starting a fire, the closure 21, is opened to afford a direct path to the flue 4. After the fire has been started, the closure 21 is adjusted to the full line position as shown. Then, the products of combustion sweep along the lower face of bottom wall 11 and are spread radially outwardly toward the shell 1, with which they come into effective contact. Wall 13, forces the products of combustion to flow closely adjacent shell 1 and then, by reason of the insulator drum, the path is indicated by the arrows as being downwardly inside of wall 13, to the bottom of the drum, and thence along the top face of wall 11, radially inwardly toward the inlet 23. This inlet 23, communicates with extension 18, and from the latter, the flow is outwardly through the flue 4.

Now by reason of the fact that the wall 11, acts as a crown sheet, and because of the material of which it is constructed, it will soon glow with a degree of incandescence after the fire is started. Because of the fact that the products of combustion are forced to come into contact with the wall 11, before entering 23, it will be seen that the same are superheated and expanded so that the draft will be very appreciably accelerated. In fact, this acceleration of draft will be sufficient to more than overcome any retardation caused by the circuitous course of flow. Further, this acceleration of draft will, in great measure, sweep the fine ash accumulations from the top of wall 11, into entrance 23, and out the flue 4. The soot, that is carried upwardly by the products of combustion and forced to make the circuitous path, will not only be broken up, but will be effectively burned and destroyed while passing along the lower and top face of wall 11.

Should there be any necessity of cleaning out wall 11, I may provide a cleanout door 24, in shell 1, and a small opening 25, in wall 13, to remove any accumulations. However, the device will, to a maximum extent, avoid any such accumulations.

It is believed that the device of my invention will be fully understood from the foregoing description, and while I have herein shown one specific form of my invention, I do not wish to be limited thereto except for such limitations as the claims may import.

I claim:

1. In a room heating device, a heat radiating shell having a fire grate and a flue, a cup-like flame spreader of such high heat conductivity as to become incandescent and being disposed above said grate and having a bottom wall for spreading the flames toward said shell, said spreader having an upright wall for retaining the flames in close adjacency to said shell, and a hollow dead air insulator drum disposed in said spreader and having a bore opening through its bottom for connection with said flue and forcing the products of combustion to closely traverse the inside face of said upright wall and the top face of said bottom wall before entering the flue.

2. In a room heating device, a cylindrical heat radiating shell having a fire grate and a flue, a cylindrical cup-shaped flame spreader of such high heat conductivity as to become incandescent and being disposed above said grate and having a bottom wall for spreading the flames radially outwardly toward said shell, said spreader having an annular upright wall for retaining the flames in close relation to said shell, and a hollow dead air drum disposed within said spreader and having a bore connected with the flue and opening through the bottom of said drum to said spreader whereby the products of combustion will be forced to traverse the inside face of said upright wall and the top face of said bottom wall before entering said flue.

3. In a room heating device, a heat radiating shell having a grate and a flue, a cup-shaped flame spreader over the grate for spreading the flames against said shell, and a drum in said spreader forcing the products of combustion to flow downwardly in said spreader and across the bottom wall thereof to heat and expand said products of combustion, and said drum having a bore connected with said flue and opening to a lower part of said spreader and being of increased size with respect to said flue, whereby an increased capacity will be afforded for the accelerated draft initiated by heating the products of combustion in said spreader.

In testimony that I claim the foregoing as my own, I hereby affix my signature.

LEROY O. STEINKE.